3,539,303
MEANS FOR PRODUCING FINE PARTICLE SIZE
PYROGENIC TITANIUM DIOXIDE
Achim Kulling, Opladen, and Erich Noack, Odenthal,
uber Bergisch Gladbach, Germany, assignors to Titangesellschaft mbH, Leverkusen, Germany, a corporation of Germany
Filed Aug. 11, 1967, Ser. No. 659,907
Claims priority, application Germany, Oct. 13, 1966,
T 32,259
Int. Cl. B01k 1/00
U.S. Cl. 23—277
1 Claim

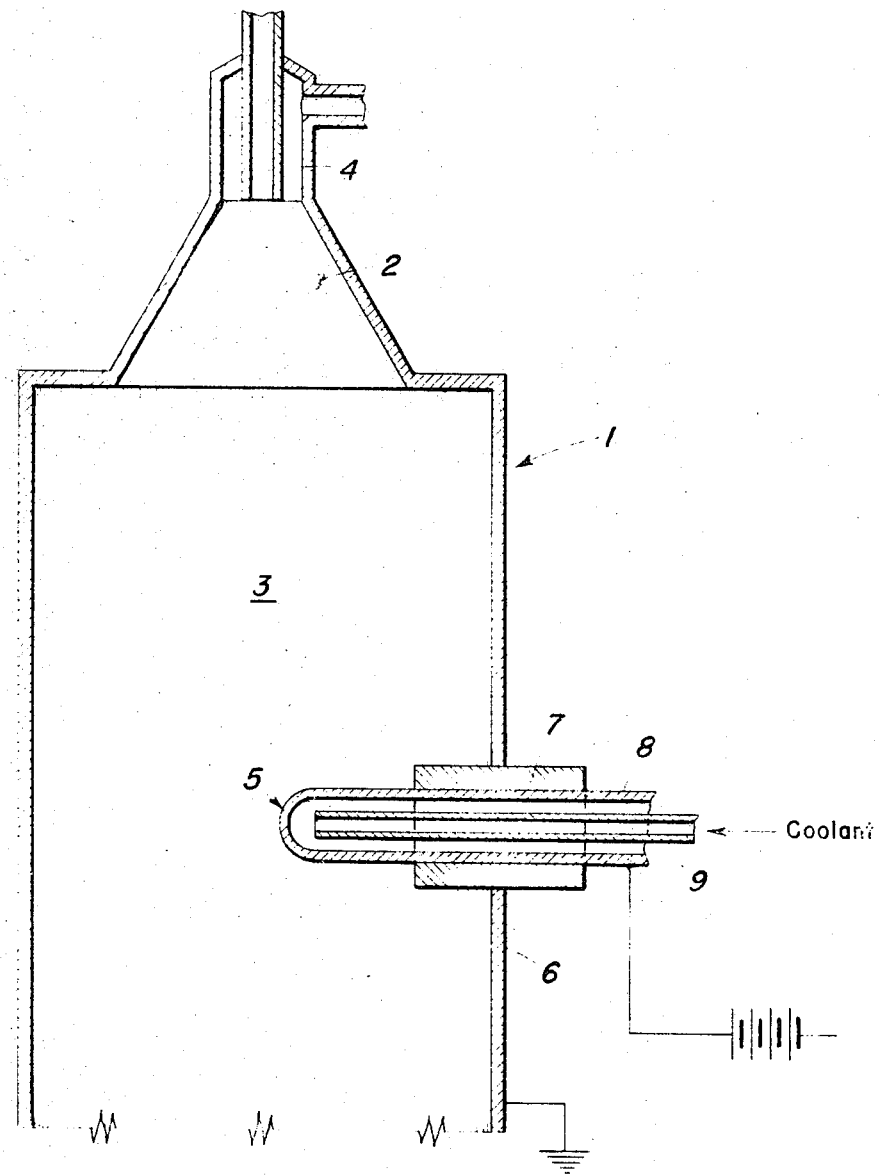

ABSTRACT OF THE DISCLOSURE

The present invention relates in general to the production of pyrogenic titanium dioxide by the reaction of titanium tetrachloride with oxygen and more especially to means for separating freshly formed pyrogenic $TiO_2$ from the reaction product gases in a manner and by suitable means to prevent formation of hard, crust-like deposits of $TiO_2$ on the walls of the reaction chamber; and to effect rapid coagulation of the fine, individual particles of $TiO_2$.

BACKGROUND OF THE INVENTION

The invention would appear to be classifiable in the field of invention covered by Class 23 Subclass 177 of the U.S. Patent Office Classification System.

In the production of pyrogenic titanium dioxide by reaction of vaporous titanium tetrachloride with oxygen or a gas containing oxygen the individual reactants and, as the case may be, one or more auxiliary gases, are passed into a reaction chamber where within a definite zone the reaction occurs at high temperatures. In this reaction the titanium dioxide is produced first as an individual solid particle of extremely fine size. This finely divided titanium dioxide fills the reaction chamber in the form of smoke and, in the course of the process, some of this finely divided $TiO_2$ separates out of the reaction product gases and deposits at the mouth of the burner and on the walls of the reaction chamber. These deposits form hard, firmly adhering crusts which may gradually reach considerable thickness. These thick crusts have very poor heat conductivity and inasmuch as the temperature within the reactor is controlled by heating and cooling means at the outer wall of the reactor, these heat insulating crusts seriously interfere with the control of the temperature in the reactor. Moreover these thick crusts change the flow of the reacting gases and hence the reaction of the gases to such an extent that the properties of the pigment produced are impaired—and under some conditions increasing crust formation has actually stopped the reaction entirely. Further, large sizes of these deposits will sometimes detach themselves from the walls and drop into the fine particle size product collected below the reaction chamber and hence a special processing step must be employed to free the fine material of these large pieces.

Therefore it has been suggested to remove the crust like deposits from the reaction chamber wall by scouring the latter with the aid of relatively coarse, hard particles that are whirled within the gas mixture (French Pat. No. 1,345,178; Belgian Pat. No. 549,091; German Pat. No. 1,119,838). These scouring particles are carried out of the reaction chamber together with the reaction products, i.e., finely divided $TiO_2$, and must be separated from the latter in a special processing step to preclude contamination of the $TiO_2$. In addition, the chamber wall may be subject to damage. It has also been proposed to remove the $TiO_2$ crust by chemical means, for example, by chlorination of the deposited titanium dioxide (British Pat. No. 715,255; German DAS 1,176,630; U.S. Pat. No. 2,619,434). For this purpose it is necessary to either interrupt the reaction from time to time; or the wall of the reaction chamber must be made of an expensive porous material, which is not very strong mechanically, through which the chlorine diffuses into the chamber.

Moreover in the earlier processes an additional difficulty has been encountered namely the fine particle size titanium dioxide coagulates only gradually to form larger agglomerates and hence considerable space is required for adequate coagulation before the coagulated titanium dioxide may be separated from the reaction product gases. Also, owing to the fact that frequently a part of the titanium dioxide in the reaction product gases is not coagulated when leaving the reaction chamber, formation of firmly adhering titanium dioxide deposits, and even clogging, may take place in the parts of the apparatus connected with the reaction chamber.

SUMMARY OF THE INVENTION

The present invention is the discovery of an improved means for separating finely divided $TiO_2$ from reaction product gases in a manner to prevent the formation of titanium dioxide deposits on the reactor walls and to cause the fine individual particles of $TiO_2$ to coagulate relatively rapidly; and is characterized by passing the $TiO_2$ burdened reaction product gases through a high tension field located outside the reaction zone of the reactor but immediately adjacent thereto. It is particularly advantageous to pass the titanium dioxide burdened reaction product gases through the high tension field before the gases have been cooled to below 400° C. the preferred temperature of the $TiO_2$ burdened gases being from 500–800° C. in the high tension field.

The method and means of this invention are to be distinguished from known methods for separating solids from gases electro-statically wherein solids burdened gases are passed through one or more electric fields in which the particles are charged and then separated on an electrode. These methods are, however, basically different from the process according to this invention. Known generally as electrical precipitators, typical of which is the Cottrell precipitator, these precipitators are applicable only with gases of a relatively low solids content and serve in general for the separation, from the gases of solid residues that have not been removed previously by a preceding mechanical separation process. In general it may be said that the Cottrell type precipitator works satisfactorily only if the solids content of the gas is low.

Hence, if and when used for separating $TiO_2$ particles from reaction product gases, a major part of the $TiO_2$ is removed from the gases by mechanical means i.e. bag filters and the like, before the gases are passed through the Cottrell precipitator. Moreover the temperature of the dilute gases in an electrical precipitator of the Cottrell type are only from about 50–200° C. which is considerably lower than the temperature of the solids burdened reaction gases of the present invention.

The aim of the process according to the present invention is not only to separate the solid particles from the gas mixture but, in addition to separate the $TiO_2$ gases in such a manner as to prevent the formation of titanium dioxide deposits on the walls of the reaction chamber and to effect a rapid coagulation of the fine particle size titanium dioxide; and these objectives are accomplished by passing the relatively hot solids burdened gas through a high tension field in the reaction chamber of the reactor to separate and coagulatae the $TiO_2$ particles. Actual separation of the coagulated titanium dioxide particles from the gas mixture occurs, not within the reaction chamber, but only after the gas mixture has left the reaction chamber and has been cooled down to below 400° C. at which temperature actual separation of the coagulated pigment from the gases may be carried out in a manner known as such, e.g., by means of bag filters or the like.

The process of the invention is also to be distinguished from a prior art process in which reaction of metal halides with oxygen is carried out directly in an electric field i.e. the electric field is in the reaction zone of the reactor (Dutch patent application 6513696). This Dutch process is designed to produce oxide particles of very small size for use as nuclei in the production of titanium dioxide pigment by the reaction of titanium tetrachloride with oxygen, or for other special applications. The reaction gases have a high temperature (800–1600° C.) in the electric field and the oxide particles formed are charged by attracting gas ions or by the splitting off of electrons in various ways and in this way growth of the particles is prevented. This process is therefore basically different from the process according to the present invention, nor does it have as its objectives the prevention of deposits at the burner or on the wall of the reaction chamber, nor a faster coagulation of the oxides.

In contrast to the Dutch process the high tension field used in the process according to the present invention is not in the reaction zone itself but is outside of the reaction zone. Consequently the fine particle size titanium dioxide is formed first in the reaction zone and thereafter the particles are coagulated by passing them through the high tension field in the reaction chamber. A slight amount of floc may indeed be deposited on the walls of the reaction chamber but this does not form the thick adhering crusts which characterized the deposits of the prior art but, on the contrary, essentially loose layers only which drop off automatically on further growth. In addition, it has been found that owing to the presence of the high tension field the temperature in the upper part of the reaction chamber is lowered by several hundred degrees which exerts a favorable effect on the quality of the pigment obtained.

The improved process of the present invention may be operated for protracted periods of time and produce, consistently, a $TiO_2$ pigment of the same high pigment quality. Also owing to coagulation of the individual particles of $TiO_2$ the titanium dioxide flocculates rapidly out of the gas mixture which facilitates considerably the separation of the titanium dioxide from the gas mixture after it has left the reaction chamber and has been cooled down. It has also been found that the product obtained according to the present invention is freed much more easily from acid residues, in a manner known as such, than a product produced by prior art processes and it has been postulated that this may be because rapid coagulation of the fine titanium dioxide particles at relatively high temperatures strongly reduces the ability of titanium dioxide to adsorb chlorine, hydrogen chloride or $TiCl_4$.

DESCRIPTION OF THE DRAWING

The drawing is a schematic elevation in section of a reaction chamber including a tubular burner used in the production of a vapor phase pigment and showing an electrode probe in the wall of the reaction chamber for producing the high tension field therein.

PREFERRED EMBODIMENT OF INVENTION

A reactor particularly suitable for carrying out the process according to the present invention is shown in the drawing and comprises a reaction chamber made of metal, or a suitable nonmetallic material fitted with an outer metal wall. Mounted above the reaction chamber are burner tubes for feeding titanium tetrachloride, oxygen or a gas containing oxygen and, as the case may be, one or more auxiliary gases, into the reaction zone of the reactor. Furthermore the reaction chamber is provided with a high tension electrode let into the side of the reaction chamber at a definite distance below the burner tubes.

Referring to the drawing which shows by way of example, a preferred form of device for carrying out the invention:

The reactor, which is indicated generally at 1 consists of a cone-shaped upper part 2 hereinafter referred to as the reaction zone of the reactor, and a prismatic lower part connected with it, the lower part 3 being identified as the reaction chamber. Mounted above the cone-shaped reaction zone 2 is the burner which comprises several concentrically arranged tubes indicated generally at 4 for introducing titanium tetrachloride, oxygen or gas containing oxygen and, as the case may be, one or more auxiliary gases into the cone-shaped reaction zone 2. At a certain distance below the latter an electrode 5 projects into the reaction chamber 3 from the side thereof. The electrode 5 is separated from the metal wall 6 of the reaction chamber by insulation 7 and consists of a metallic tube 8 closed at its inner end into which a cooling medium, e.g. air or water, may be introduced by an inner concentric tube 9.

An electric high tension field is built up within the reaction chamber 3 between the electrode 5 and the chamber wall 6 wherein, expediently, the chamber wall 6 is grounded. It is immaterial however so far as the effectiveness of the device of this invention is concerned whether the electrode 5 is positively or negatively charged with respect to the chamber wall 6. Also the voltage employed will depend on the size of the reaction chamber.

It has been found that the distance between the electrode 5 and the reaction zone 2 is critical. Thus the electrode must not be arranged too near the reaction zone because here the high temperatures caused by the reaction strongly ionize the surrounding gases thus imparting to them increased conductivity so that a sufficiently strong electric field can not be formed. If, on the other hand, the electrode is placed too far below the reaction zone it acts solely as an electrostatic separator device without preventing crust formation on the chamber wall; nor is a uniform product obtained. Furthermore the temperature of the gas mixture in the neighborhood of the electrode is important and should be over 400° C. but less than the temperature in the reaction zone and preferably between 500–800° C.

While the electrode 5 is shown as a substantially cylindrical probe it will be understood that it may be of different shape, for example, substantially flat. Also more than one electrode may be used in which case the several electrodes may be arranged at the same or different heights in the reaction chamber. Further, the reaction chamber may be cylindrical rather than prismatic and the conical reaction zone 2 of the reactor may be left out entirely in which case the burner tubes 4 would then discharge directly into the upper end of the prismatic or cylindrical reaction chamber 3. Two, three or even more burner tubes may be provided, arranged concentrically or in other ways as for example, separately, or, as the case may be, at oblique angles to the longitudinal axis of the reaction chamber. The reaction chamber may be heated or cooled from the outside. The reaction of the titanium tetrachloride with the oxygen or the gas containing oxygen may be carried out with or without an auxiliary flame produced by a flammable gas.

The following examples serve for more detailed explanation of the invention. In showing the improvements achieved by the present invention, tinting strength was chosen as a measure of the quality of the pigment obtained, and was determined according to the following standardized laboratory method:

TINTING STRENGTH TEST

A carbon black mixture of 5.6 g. carbon black and 1500 g. precipitated calicum carbonate was made. From 1.0 g. of this carbon black mixture a sample paste was made with a definite amount of the pigment to be examined and 0.425 g. linseed oil. Besides that, a standard paste was made comprising 1.0 g. of the carbon black mixture, a definite amount of a standard pigment and 0.425 g. linseed oil. The sample paste and the standard paste were drawn-down side by side on a glass slide and the coats were examined visually at its back side through the slide and their brightness compared. If the sample paste was lighter, a new sample paste with a smaller amount of pigment was made; if, on the other hand, the standard paste was lighter, a new sample paste with a larger amount of pigment was made. The amount of the pigment to be investigated was varied until the brightness of the sample paste equalled that of the standard paste. As numerical value of the tinting strength there was taken 100 times the reciprocal value of the weighed-in pigment in grams which showed the same brightness as the standard paste. The higher this numerical value is, the better is the tinting strength of the pigment.

EXAMPLE I

A device as shown in the drawing was employed. The reaction chamber 3 of the reactor consisted of aluminum and was rectangular in cross-section with its interior sides 1000 mm. and 500 mm. in length, respectively, and a height of 3900 mm. The upper conical reaction zone 2 of the reactor had a height of 450 mm. and an inner diameter at its base of 390 mm. Concentrically arranged burner tubes 4 were assembled in the top of the reaction zone 2 for discharging the reacting gases therein. An electrode 5 was mounted in a radial aperture in one of the wider side walls of the reaction chamber about 1200 mm. below the intersection of the conical reaction zone 2 with the upper end of the reaction chamber 3. The electrode was formed of 5 mm. thick aluminum sheet formed into a tube 8 closed at its inner end, the length of the electrode being 500 mm. and its outer diameter 30 mm. The electrode was let into the reaction chamber far enough to project 300 mm. into the latter. In order to insulate it from the chamber wall 6 the aluminum electrode tube 8 was surrounded by a quartz tube 7, which was 70 mm. wide and 240 mm. long and 3 mm. thick. In order to prevent sparking the quartz tube 7 projected into the reaction chamber up to 150 mm. so that the aluminum electrode projected only 150 mm. beyond its insulation. An inner concentric tube 9, made of brass and fitted with separators to maintain proper distance, passed cooling air to the hot part of the electrode. For measuring the temperature within the reaction chamber, a thermocouple (not shown in the drawing) was assembled in the reaction chamber at the level of the electrode and 60 mm. from the chamber wall.

Through the individual burner tubes 4 were added 50 kg./hr. titanium tetrachloride, which had been preheated to 320° C.; 7 standard cu. m./hr oxygen which had been preheated to 240° C., 6 standard cu. m./hr. carbon monoxide which had a temperature of 20° C., as well as 3 standard cu. m./hr. of oxygen at a temperature of 20° C. The electrode 5 was charged with a positive potential of 40 kv. in respect to the chamber wall 6. Samples of loose pigment were obtained after a reaction period of 30 minutes and a reaction period of 180 minutes, respectively. The former sample had a tinting strength of 1475 the latter a tinting strength of 1450. Thus there was practically no reduction in tinting strength. The temperature measured with the thermocouple in the space surrounding the electrode was 483° C. after 30 minutes and 683° C. after 180 minutes. After 180 minutes a coating of $TiO_2$ only 10 mm. thickness had formed on the chamber wall.

When Example I was repeated with the exception that no voltage was applied between the electrode 5 and the chamber wall 6 a very fine particle size pigment was obtained which, after a reaction time of 30 minutes also had a tinting strength of 1450 but as the reaction continued the tinting strength diminished rapidly and amounted to only 1250 after 180 minutes. The temperature in the space surrounding the electrode probe was as high as 623° C. after 30 minutes, and after 180 minutes had risen to 903° C. After a reaction period of 180 minutes a coating of $TiO_2$ having a thickness of 60 mm. was found on the chamber wall.

EXAMPLE II

The same device as in Example 1 was employed with the difference that the electrode 5 was charged negatively in respect to the chamber wall. The temperature in the reaction chamber was measured by means of a thermocouple which projected 270 mm. into the reaction chamber at a level of the electrode 5. By means of the individual burner tubes 4 50 kg./hr. titanium tetrachloride which had been preheated to 320° C.; 8 standard cu. m./hr. oxygen, preheated to 250° C.; 6 standard cu. m./hr. carbon monoxide at 20° C., as well as 2 standard cu. m./hr oxygen at 20° C. temperature were introduced into the reactor. The voltage was set initially at 60 kv. and was reduced to 50 kv. after 180 minutes. The reaction period was 420 minutes. The pigment obtained over the whole period had a tinting strength of 1525–1550. The temperature in the space surrounding the electrode rose, during the experiment, from 426 to 748° C. At the end of the reaction the thickness of the $TiO_2$ coating on the reactor wall was only 10 mm.

From the foregoing description and examples it will be evident that by utilizing a high tension field in the reaction chamber of a reactor for producing pyrogenic titanium dioxide and more especially at a critical point therein wherein the temperature is at least 400° C. but below the temperature in the reaction zone of the reactor the fine individual particles of titanium dioxide are separated from the reaction product gases in a manner which precludes thick deposits of titanium dioxide on the walls of the reactor, as a consequence of which the reactor may be operated continuously without plugging or overheating and the quality of pyrogenic $TiO_2$ is consistently uniform. Moreover the individual particles of $TiO_2$ are coagulated relatively rapidly thus facilitating subsequent separation of the coagulated $TiO_2$ from the reaction product gases.

While this invention has been described and illustrated by the examples shown, it is not intended to be strictly limited thereto, and other variations and modifications may be employed within the scope of the following claim.

We claim:

1. In a metallic reactor for producing pyrogenic titanium dioxide wherein feed means are arranged at one end of the reactor for feeding vaporous titanium tetrachloride and oxygen, or gases containing oxygen, into a reaction zone at said one end of the reactor to produce titanium dioxide burdened reaction product gases therein, said reactor having a reaction chamber remote from said reaction zone the improvement comprising: means arranged to electrically ground said metal reactor, electrical means mounted in the reaction chamber of said reactor arranged to provide a high tension electric field in a limited portion only of said reaction chamber said electrical means comprising a hollow metallic probe, electrical insulation comprising a sleeve on the outer end of said probe constructed and arranged to support said probe in an aperture in the wall of said reaction chamber transversely of its longitudinal axis and intermediate the opposite ends of said reaction chamber said insulation sleeve being shorter than said probe whereby the inner end of said probe is electrically uninsulated, and means connected to said hollow probe arranged to circulate a coolant therethrough.

References Cited

UNITED STATES PATENTS

| | | | |
|---|---|---|---|
| 2,758,666 | 8/1956 | Prentiss | 55—7 |
| 3,404,084 | 10/1968 | Hamilton | 204—192 XR |
| 3,434,950 | 3/1969 | Weinberg et al. | |

JAMES H. TAYMAN, Jr, Primary Examiner.

U.S. Cl. X.R.

23—202, 284; 55—2, 11, 71, 101, 135; 204—164